Figure 1:
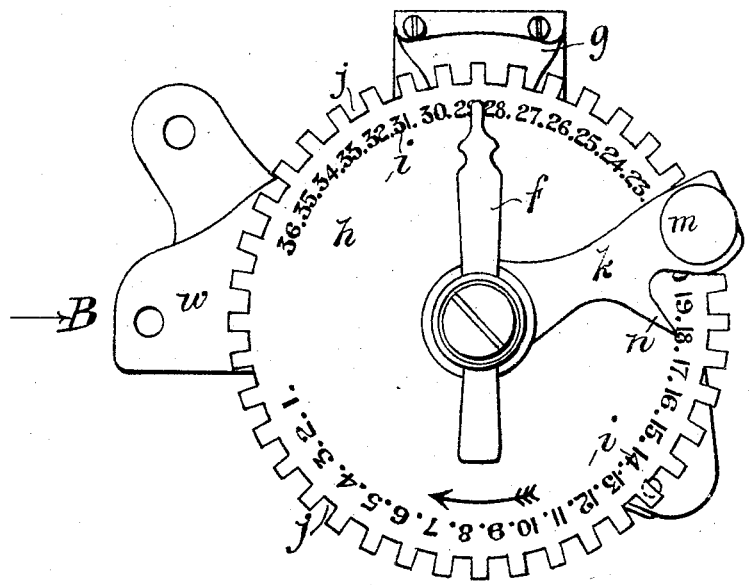

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 9 SHEETS—SHEET 1.

ATTEST,
C. B. Middleton
Edward Sarton

INVENTOR
WILLIAM COWAN
By Ellis Spear & Company
ATTY'S

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 9 SHEETS—SHEET 2.

ATTEST:
C. J. Madleton
Edward Sartin

INVENTOR
WILLIAM COWAN
By Ellis Spear & Company
ATTY'S

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 3 SHEETS—SHEET 3.

ATTEST:
C. J. Middleton
Edward Sarton

INVENTOR
WILLIAM COWAN
BY Ellis Spear & Company
ATTYS.

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 9 SHEETS—SHEET 4.

ATTEST:
C. J. Middleton
Edward Sarton

INVENTOR
WILLIAM COWAN
By Ellis Spear & Company
Attys

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 9 SHEETS—SHEET 5.

ATTEST.
C. H. Middleton
L. B. Middleton

INVENTOR
WILLIAM COWAN
By Ellis Spear & Company
ATTYS

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 9 SHEETS—SHEET 6.

ATTEST:
O. Middleton
Edward Sartin

INVENTOR.
WILLIAM COWAN.
By Ellis Spear & Company
ATTYS

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 9 SHEETS—SHEET 7.

ATTEST
INVENTOR
WILLIAM COWAN.

No. 771,896. PATENTED OCT. 11, 1904.
W. COWAN.
COIN FREED MECHANISM FOR GAS METERS OR OTHER PURPOSES.
APPLICATION FILED FEB. 9, 1904.
NO MODEL. 9 SHEETS—SHEET 9.

ATTEST:
INVENTOR.
WILLIAM COWAN.
By Ellis Spear & Company
ATTYS.

No. 771,896.

Patented October 11, 1904.

UNITED STATES PATENT OFFICE.

WILLIAM COWAN, OF EDINBURGH, SCOTLAND.

COIN-FREED MECHANISM FOR GAS-METERS OR OTHER PURPOSES.

SPECIFICATION forming part of Letters Patent No. 771,896, dated October 11, 1904.

Application filed February 9, 1904. Serial No. 192,934. (No model.)

*To all whom it may concern:*

Be it known that I, WILLIAM COWAN, a subject of the King of Great Britain and Ireland, residing at Buccleuch Street Works, Edinburgh, in the county of Mid-Lothian, Scotland, have invented certain new and useful Improvements in Coin-Freed Mechanism for Gas-Meters or other Purposes, (for which I have made application in Great Britain, No. 15,321, bearing date July 10, 1903,) of which the following is a specification.

My invention relates to improvements in coin-freed mechanism, and especially to those of prepayment gas-meters having a price-varying mechanism of what is known as the "pointer" and "scale" type.

The invention deals mainly with the coin-receiving and price-changing devices, and more especially with those forms of mechanism in which the coin carrier or pocket and the prepayment-screw revolve always in the same direction and do not require the operating-handle and coin-pocket to be receded.

Hitherto driving mechanisms for operating the prepayment or measuring-out shafts have been employed in which the driving-pawl was adapted to be brought into engagement with or withdrawn from the driving ratchet-wheel at a variable point, depending on the position of the pointer on the scale of the price-varying device.

Now the object of the present invention is to avoid the use of a driving-pawl having a varying arc of engagement and to provide a new form of mechanism in which the disengagement of the driving mechanism and the prepayment-shaft is effected directly by a pointer or projection actuated by a pointer, the angular position of the pointer being adjustable as required to meet the variations in the price of gas.

My invention consists in operating the prepayment-shaft directly through a clutch adapted to connect the prepayment and coin-pocket shafts and in effecting the disengagement of the clutch by means of a pointer or a projection controlled by the pointer, the position of which may be varied so that the operating and prepayment shafts may be engaged for a variable portion of the revolution of the operating-handle.

My invention further consists in providing the operating or coin-pocket shaft with a disk or plate provided with a scale and a variable pointer, the disk having a pin or the like adapted to liberate the clutch, which is preferably a positive one, and permit its engagement and the pointer being provided with a cam or other suitable projection adapted to disengage the clutch.

My invention further consists in an improved form of coin-pocket in which there is a pivoted obstruction-pawl provided with a projection adapted to be depressed once in each revolution of the coin-shaft and to be retained in that position by a suitable cam-surface for a sufficient portion of each revolution, whereby the coin if it has not been discharged is brought into engagement with an obstruction, so that more than one rotation of the coin-pocket for each coin is prevented.

Figure 4:
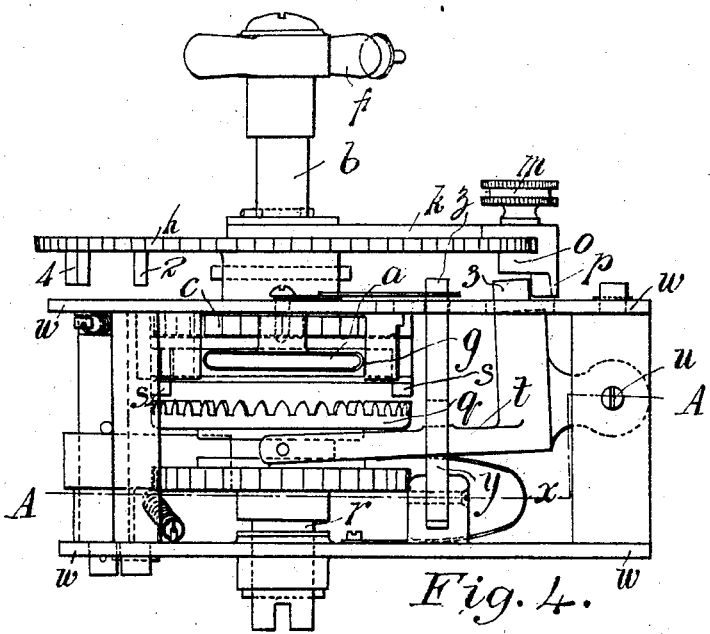
Figure 2:
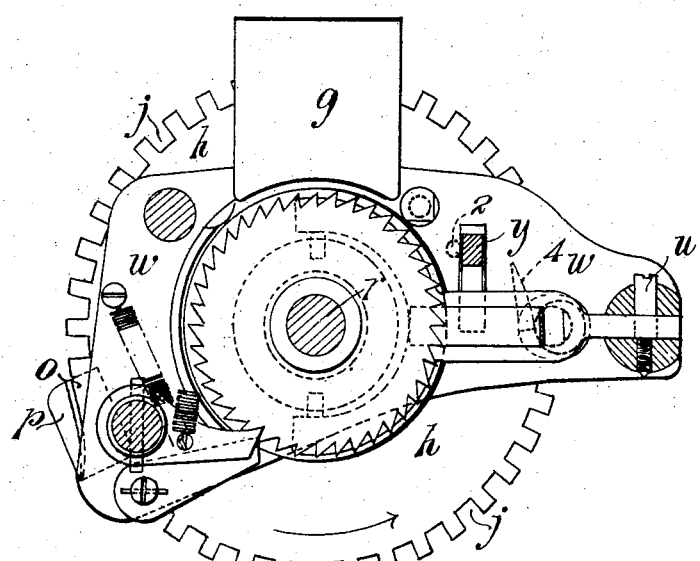
Figure 3:
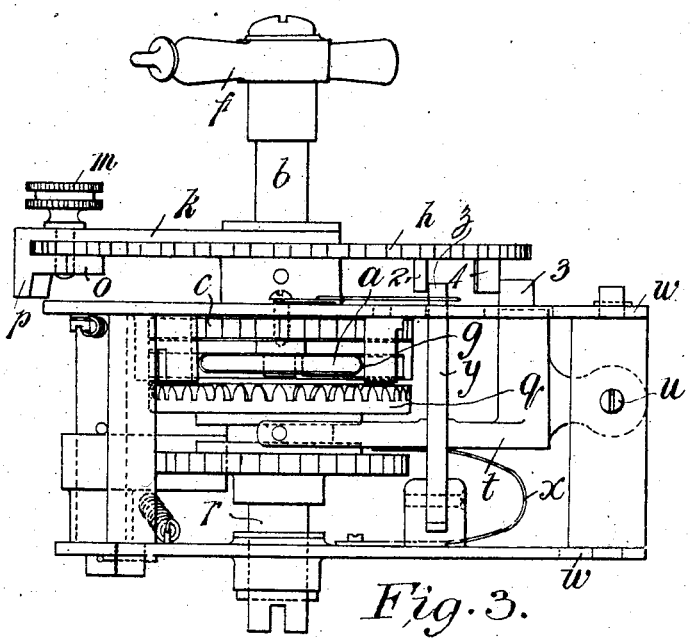
Figure 5:
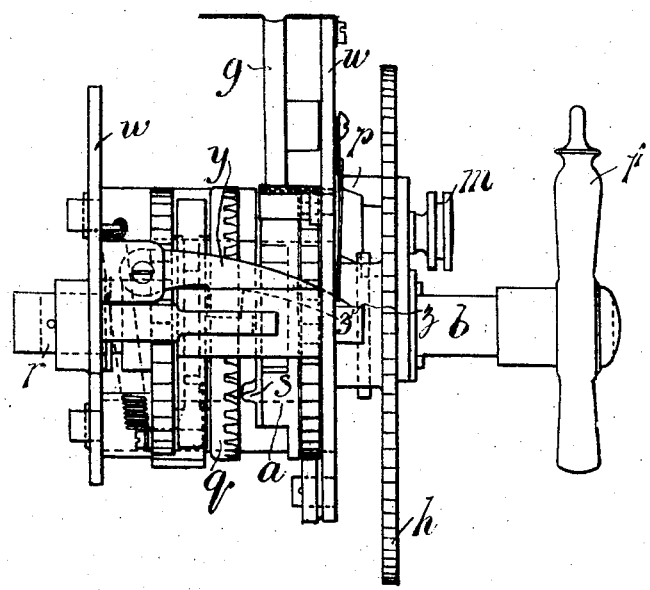
Figure 6:
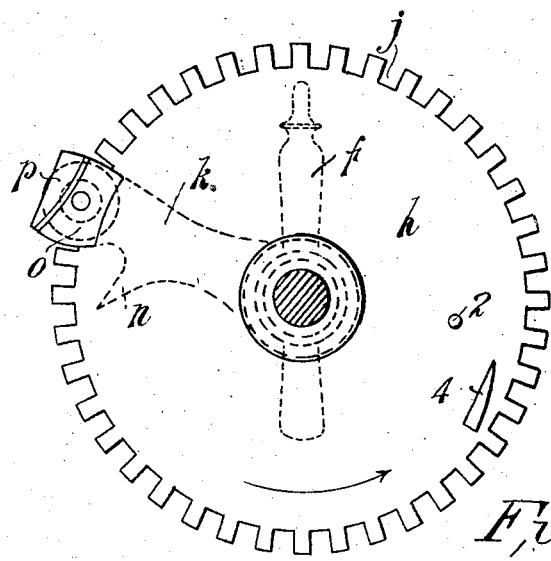
Figure 7:
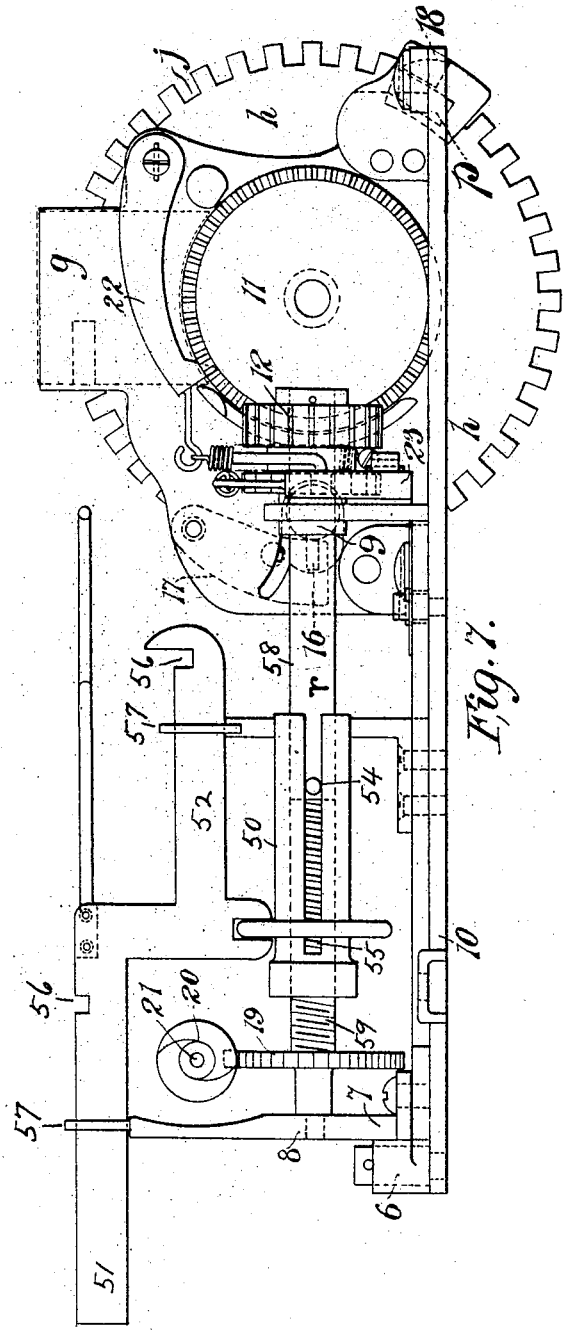
Figure 8:
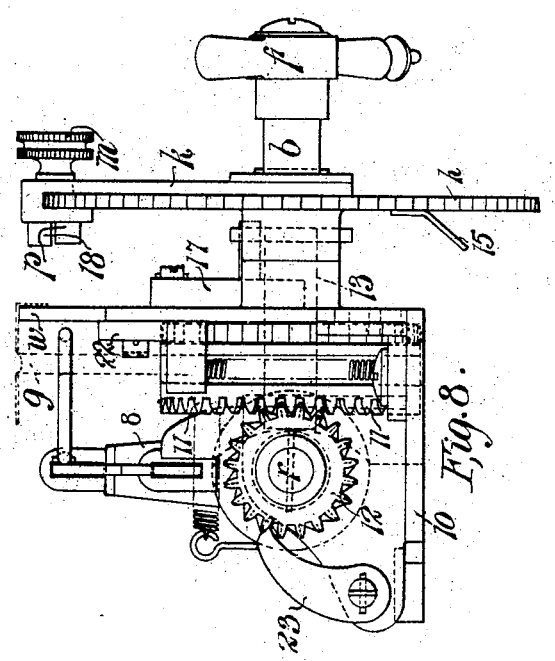
Figure 9:
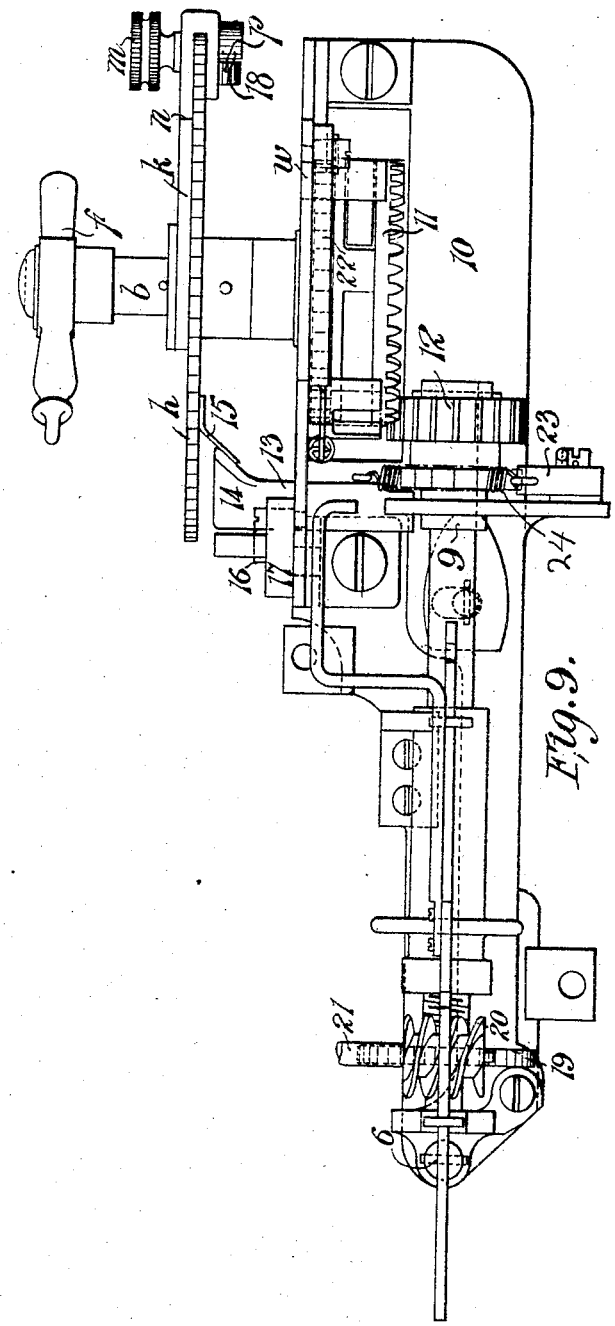
Figure 10:
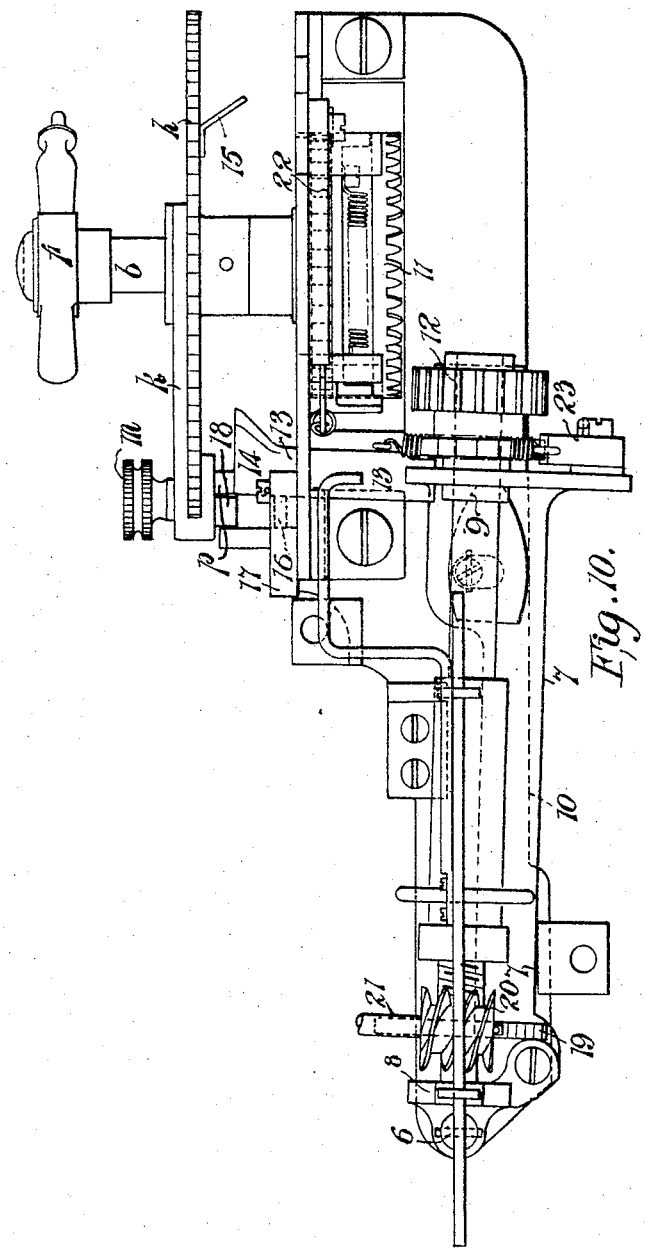
Figure 11:
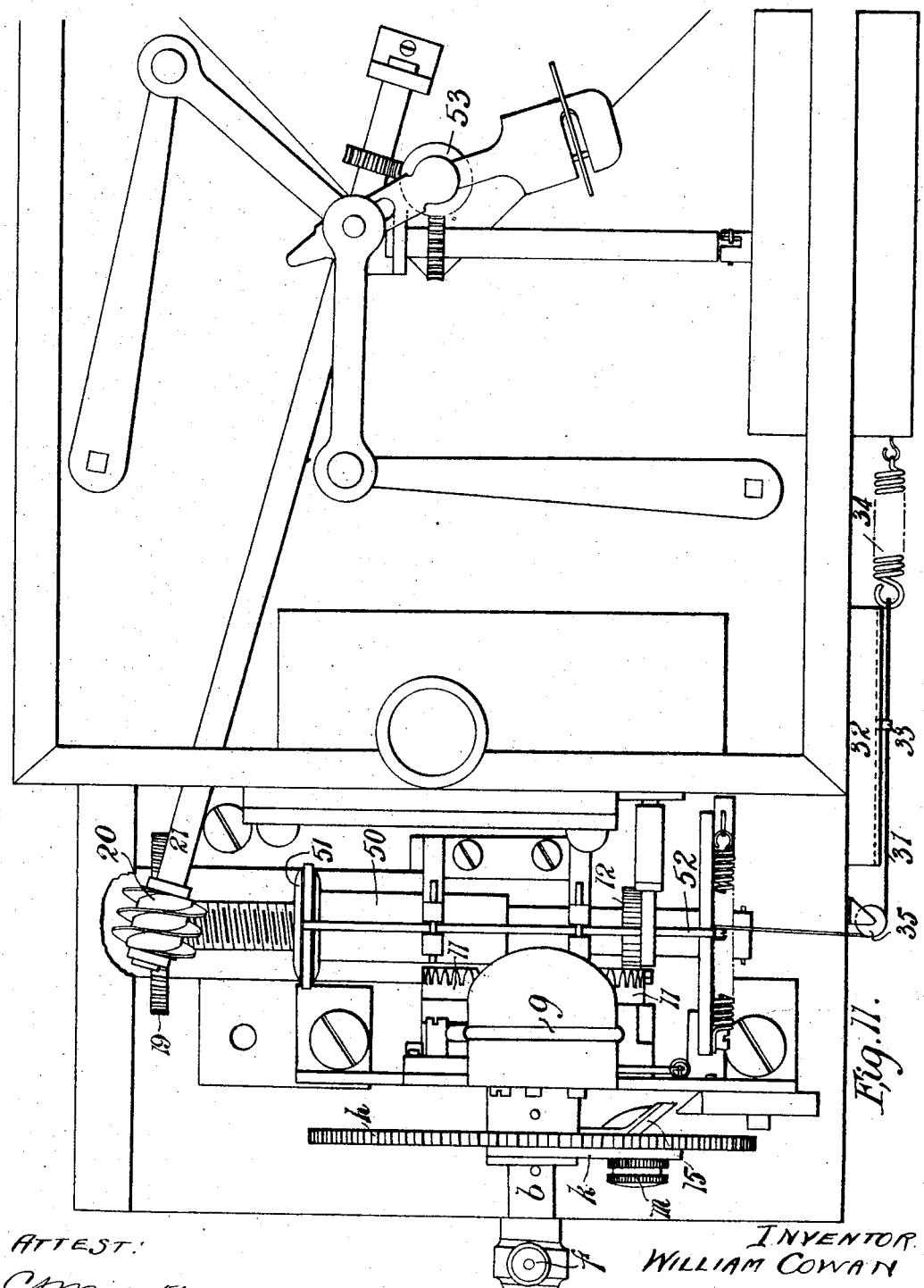
Figure 12:
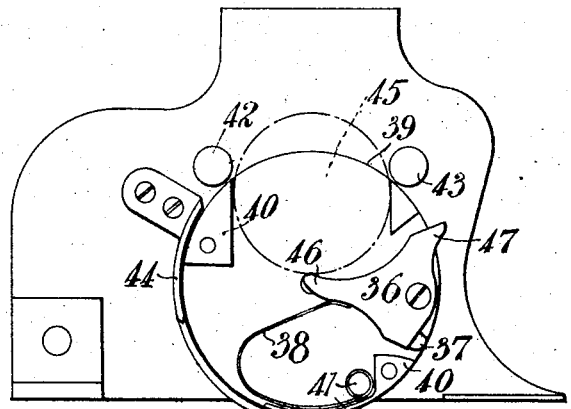
Figure 13:
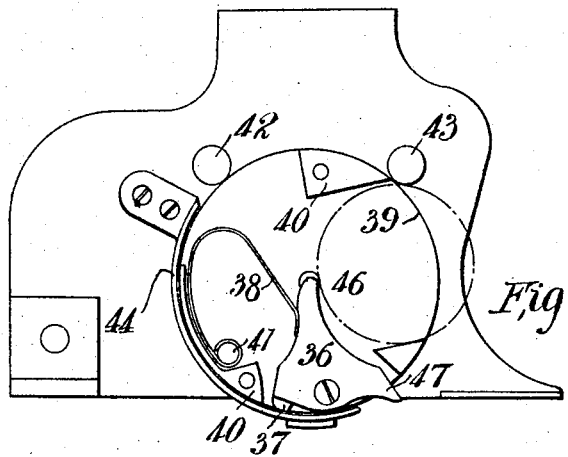

Referring now to the accompanying drawings, Figure 1 is a front elevation of a scale-disk constructed according to the invention. Fig. 2 is a sectional elevation on the line A A of Fig. 4 looking toward the back of the disk. Fig. 3 is a plan of one form of coin-pocket and clutch device, showing the clutch in engagement with the prepayment-shaft. Fig. 4 is a plan of the same, showing the clutch just disengaged by means of the pointer-cam or projection. Fig. 5 is a side elevation of Fig. 1 looking in the direction of the arrow B. Fig. 6 is a back view of the disk, showing the actuating cams or projections. Figs. 7 and 8 are side and end elevations, respectively, of a modified form of my invention in which one end of the prepayment-shaft is mounted upon a swiveling bearing and the other in a sliding bearing adapted to move through a small arc. Fig. 9 is a plan of Fig. 7, showing the prepayment-shaft in engagement with the coin mechanism; and Fig. 10 is a plan of the same, showing the shaft disengaged. Fig. 11 shows the apparatus applied to an ordinary gas-meter. Fig. 12 shows an improved construction of coin-pocket, and Fig. 13 illustrates the operation of the coin-pocket shown in Fig. 12.

In carrying my invention into effect according to the form shown in Figs. 1 to 6 I firmly secure a coin-pocket $a$ to the operating-shaft $b$ and provide it with any convenient means for preventing rotation of the coin-pocket except when a coin is present. The coin is admitted to the coin-pocket through the coin-guide $g$, an operating-handle $f$ being secured to the coin-pocket shaft whereby the coin-pocket may be rotated when it contains a coin. On the coin-pocket shaft I secure a disk or circular plate $h$, provided with a scale $i$ and preferably a number of notches $j$ around its circumference. Loosely mounted on the operating-shaft $b$ is an arm $k$, the end of which is bent over the circumference of the disk and is provided with a screw-pin $m$, adapted to engage with any of the notches $j$ and to clamp the arm to the disk. The arm $k$ carries a pointer $n$, Figs. 1 and 6, which may be moved with the arm to any desired position on the scale and secured there by the screw-pin $m$. The bent-over part $o$ of the arm $k$ is provided with a cam or projection $p$. It will be seen instead of providing a single arm with a bent-over end $o$ two arms may be provided, one on each side of the disk, the two arms being clamped to the disk by the screw-pin $m$, or the arm may be in the form of a plate carrying a cam, projection, or the like. Over the inner end of the prepayment-shaft $r$ adjacent to the coin-pocket I loosely mount a clutch-wheel $q$, which is prevented from rotating upon the prepayment-shaft $r$, but which may be moved along it so as to engage with one or more teeth or projections $s$, Figs. 4 and 5, carried by the coin-pocket $a$. The clutch-wheel $q$ may be operated by a fork-lever $t$ or the like, pivoted at $u$ to a distance-piece between the side framing $w$ $w$ of the mechanism or to any other suitable part. The clutch may be thrown into engagement with the coin-wheel by a spring $x$ of any suitable form, and it may be held out of engagement against the resistance of the spring by a pivoted finger or trigger $y$, the end $z$ of which is prolonged and adapted to be lifted by a pin or projection 2, carried by the disk. The clutch-lever is provided with an extension 3, against which the cam $p$ on the disk presses once during each revolution of the operating-handle in order to effect the disengagement of the clutch when the prepayment-shaft has been rotated the desired amount. Instead of or in addition to the spring $x$ there may be provided a cam projection 4 (see Figs. 2, 3, 4, and 6) on the disk adapted to positively effect the engagement of the clutch-wheel with the coin-pocket by coming in contact with the extension 3 of the clutch-lever $t$.

The operation of the device is as follows After placing the screw-pin $m$ of the pointer to the position for setting off the determined volume of gas to be supplied for the coin in the pocket the handle $f$ is rotated. As the disk $h$ and pointer-arm $k$ revolve the pin 2 on the disk $h$ comes in contact with the end $z$ of the retaining finger or trigger $y$ and lifts it clear of the clutch-lever $t$. The clutch-wheel immediately slides along the prepayment-shaft under the action of the spring, or the cam 4 comes into operation with the end 3 of the lever $t$ and positively puts the clutch into engagement with the teeth $s$ of the coin-pocket wheel. The prepayment-shaft $r$ is then rotated, together with the coin-pocket shaft, until the cam $p$ on the pointer-arm $k$ comes in contact with the extension 3 of the clutch-lever and positively moves the clutch-wheel $q$ out of engagement with the coin-pocket. The clutch-lever is then retained in its disengaged or off position by the finger $y$, so that the operating-handle, disk, and coin-pocket are disengaged from the prepayment mechanism during the remainder of the revolution.

It will be seen that by varying the circumferential position of the cam $p$ the prepayment mechanism may be operated during a greater or smaller portion of the complete revolution of the operating-handle, as may be desired.

In a modification of my invention (shown in Figs. 7 to 11) I mount the end of the prepayment-shaft remote from the operating mechanism in a bearing 8, carried by a frame 7, which is pivoted at 6 to a flat base 10, the other end of the shaft being supported in a bearing 9 in the free end of the frame 7, so that it is capable of being moved through a small arc. I provide the coin-pocket with a crown-wheel 11, and on the adjacent end of the prepayment-shaft I secure a small spur-wheel 12, adapted to be moved directly into and out of gear with the crown-wheel 11, as the frame 7, carrying the shaft, is moved about its pivot 6. The end of the frame adjacent to the crown-wheel has connected to it an arm or rod 13, adapted to slide in a hole in the main framing $w$ of the coin-pocket device. The arm extends through the framing $w$ toward the disk and is provided with a tapered foot 14. The disk is provided with a curved cam 15, adapted to engage with the foot 14, as shown in Figs. 7, 8, and 9, and to draw the wheel 12 into engagement with the crown-wheel. As long as these wheels are held in engagement rotation of the handle will operate the prepayment-shaft. To prevent premature engagement of the prepayment and crown wheels, the rod 13 is provided with a pin 16, with which a weighted pawl 17, pivoted to the framing $w$, is adapted to engage, as seen in Figs. 7 and 9. The prepayment device is disengaged from the crown-wheel 11 of the coin-pocket by means of the cam $p$, carried, as hereinbefore described, upon the pointer-arm. The end of the arm is provided with an additional cam 18, which is adapted to press against the pin 30 on the pawl 17, and thereby to move the pawl 17 clear of the pin 16 on the rod 13 immediately before the cam $p$ engages with the end of the rod 13. When the cam $p$ comes into engagement with the end of the rod 13, the frame is swung about its axis, thus moving the wheel 12 out of engagement with the crown-wheel 11. The position of the cam $p$ of course in this construction, as in the one described with reference to Figs. 1 to 6, determines the amount of movement given to the prepayment-shaft, and it is evident that the rod 13 performs the same function as the clutch-lever hereinbefore described, the wheel 12 of the prepayment-shaft and the crown-wheel of the coin-pocket being directly engaged or disengaged by it. The movement of the prepayment-shaft is transmitted to the gas-meter in the usual manner—i. e., by a wheel 19 on the end of the prepayment-shaft remote from the crown-wheel and a worm 20 on the meter-actuating shaft 21. It will be seen that the angle which the axis of the prepayment-shaft makes with the meter-actuating shaft 21 varies according to whether the wheel 12 is engaged with or disengaged from the crown-wheel 11. This variation is, however, very slight at the wheel 19 and does not present any practical difficulty. The coin-pocket may be prevented from moving backward by a pawl 22, (see Figs. 7 and 9,) and the prepayment-shaft is also provided with one or two pawls 23, controlled by a spring 24 to prevent back rotation. This device, in which the clutching of the coin-pocket wheel with the prepayment-shaft wheel is effected by swiveling the prepayment-shaft as above described, may be very compactly arranged in a meter, as shown in Fig. 11. In this arrangement I use a shaft 21, provided with skew-gear adapted to transmit the power direct between the prepayment-shaft and the bellows-shaft 53. This dispenses with the use of bevel-gearing, which is both difficult and expensive to manufacture. To provide means for indicating the amount of gas which has been paid for and not consumed, I provide a cord 31, Fig. 11, traveling over a pulley 35, fixed at one end to the rod 52 and at the other to a spring 34. This cord carries a pointer 33, which moves over a scale placed outside the meter and shown diagrammatically by dotted lines in Fig. 11. The prepayment-shaft $r$ is made in two parts 58 and 59. The part 59 is screwed and is in gear with a sleeve 50, which is provided with one or more slots 55, which engage with one or more pins 54, carried by the part 58. In this way as the meter-shaft 21 revolves, owing to the passage of gas through the meter, the wheel 19, which is in gear with the worm 20 and is fixed to the screwed part 59, is also made to revolve. The sleeve 50 travels along the screws 59, carrying with it the arms 51 and 52, which are provided with suitable notches 56, adapted to engage with the stops 57, so that the amount of gas which may be prepaid is limited. When a coin is inserted and the coin-pocket turned, the shaft 58 revolves through a certain angle determined by the position of the pawl $p$, as already explained. The pin 54, engaging with the sleeve 50, causes that sleeve to rotate and so travel along the shaft 59, and thus the shaft 59 is liberated for a limited amount of rotation determined by the amount which the stops 57 have been moved away from their engaging notches. It will be seen that the cord 31 is moved along with the arm 52, and so the pointer 33 shows the amount of gas paid for but not consumed. It is also evident that the part 58 of the prepayment-shaft rotates in one direction only, and thus the ratchet and pawl 23 still further insure the exact operation of the prepayment-shaft and also maintain the engaging members on the coin-pocket and prepayment-shaft always in an open position for engagement.

Fig. 12 illustrates an improved form of coin-pocket in which the usual spiral spring for effecting the discharge of the coin and the actuating of the obstruction-pawl 36 is replaced by the projection 37 and the curved spring 38. A disk 39 is provided with the usual faces 40 40, to which the crown-wheel 11 is fixed by means of screws. A pin 41, fixed to the disk 39, carries the curved spring 38, which bears against the point of the pivoted obstruction-pawl 36, shaped to the form of a curvilinear triangle. The pins 42 and 43 act as guides to the coin and also as cam-surfaces against which the coin and the obstruction-pawl become operative when the coin-shaft $b$ is rotated. A band 44, which projects above the disk 39, serves to confine the coin for the required proportion of each revolution of the coin-shaft and also acts as a cam-surface against which the projection 37 becomes operative. The projection 37 and the band 44 are in engagement for a considerable portion of each revolution of the coin-shaft. The action of the device is as follows: The coin is dropped into the coin-guide in the usual manner and falls into the position shown at 45 in Fig. 12. The coin-shaft $b$ is then rotated, and the edge of the coin comes into contact with the pin 42 and in this way depresses the tail 46 of the obstruction-pawl 36, so as to relieve the kicker 47 from its engagement with the pin 43, and the coin-shaft is then free to rotate still further. When the shaft $b$ is being rotated, the projection 37 comes into contact with the upper end of the band 44 and in this way causes the tail 46 to move the coin for a short distance toward the exit of the coin-pocket. If, however, the coin should not be discharged through some cause or other, the projection 37 bears against the band 44, as shown in Fig. 13, so as to positively prevent the further rotation of the coin-pocket until the coin has been discharged. The curved spring 38 presses against the tail 46 of the obstruction-pawl and brings the kicker 47 into operative position after the coin has been discharged and when the coin-pocket has been turned, so as to relieve the pawl 37 from the confining action of the band 44. The price-regulating and the other improvements are fitted as described above.

Having now described my invention, what I claim as new, and desire to secure by Letters Patent, is—

1. A coin-freed prepayment mechanism, comprising in combination, a coin-pocket, a prepayment-shaft, clutch members on the coin-pocket and prepayment shaft adjustable projections rotatable with the coin-pocket and adapted to engage or disengage the clutch members for a variable portion of each revolution of the coin-pocket, substantially as described.

2. A coin-freed prepayment mechanism, comprising in combination, a coin-pocket, a coin-pocket shaft, a prepayment-shaft, engaging members on the coin-pocket and prepayment shafts, a scale and projections carried by the coin-pocket shaft, the projections being adjustable on the scale and adapted to put the engaging members into or out of engagement with each other for a variable portion of each revolution of the coin-pocket, substantially as described.

3. A coin-freed prepayment mechanism, comprising in combination a coin-pocket, a coin-pocket shaft, a prepayment-shaft, engaging members on the two shafts, a scaled disk on the coin-pocket shaft and an adjustable pointer on the disk, members carried by the pointer and disk adapted to put the engaging members on the prepayment-shaft and coin-pocket in gear with each other for a variable portion of each revolution of the coin-pocket, substantially as described.

4. A coin-freed prepayment mechanism, comprising in combination a coin-pocket, a coin-pocket shaft, a prepayment-shaft, clutch members on said shafts, ratchet mechanisms on said shafts arranged to limit the rotation of the shafts to one direction and to maintain the clutch members always in a position open for engagement, substantially as described.

5. A coin-freed prepayment mechanism, comprising in combination, a coin-pocket, a coin-pocket shaft, a prepayment-shaft, clutch members on said shafts, a scaled disk on the coin-pocket shaft, adjustable members on said disk adapted to effect the engagement and disengagement of the prepayment and coin-pocket shafts for a variable portion of each revolution of the latter, a pointer actuated from the prepayment-shaft and adapted to register the amount of fluid paid for but not consumed, substantially as described.

6. A coin-freed prepayment mechanism, comprising in combination, a coin-pocket, a prepayment-shaft, adjustable projections rotatable with the coin-pocket, clutch members on the prepayment-shaft and coin-pocket adapted to be put into or out of engagement with each other by the projections for a variable portion of each revolution of the coin-pocket, a shaft provided with skew-gearing for the purpose of transmitting power directly between the prepayment-shaft and the bellows-shaft of a fluid-meter, substantially as described.

7. A coin-freed prepayment mechanism, comprising in combination, a coin-pocket, a coin-pocket shaft, a prepayment-shaft, engaging members on the two shafts, a scaled disk on the coin-pocket shaft, notches on said disk, numerals corresponding to said notches, an adjustable pointer adapted to be clamped at the desired notch on the disk, the pointer indicating the amount of fluid to be supplied at each revolution of the coin-pocket, projections carried by the pointer and disk adapted to put the prepayment-shaft and coin-pocket in gear with each other for a variable portion of each revolution of the coin-pocket, substantially as described.

8. In a coin-freed prepayment mechanism and in combination with a prepayment-shaft, provided with prepayment mechanism and means for varying the amount of fluid paid for but not consumed, a coin-pocket comprising a rotatable disk, guides on the rotatable disk, a plurality of fixed cam-surfaces, a pivoted obstruction-pawl yieldingly controlled, a projection on the obstruction-pawl adapted to be operated by one of the fixed cam-surfaces, so that if the coin be not discharged at the proper time, it is held in such a position as to prevent further rotation until the discharge has been effected, substantially as described.

9. A coin-freed prepayment mechanism, comprising in combination a coin-pocket, a prepayment-shaft pivotally mounted at its end remote from the coin-pocket, clutch members on the prepayment-shaft, adjustable projections rotatable with the coin-pocket, and adapted to swing the prepayment-shaft into or out of engagement with the coin-pocket for a variable portion of each revolution of the coin-pocket, substantially as described.

10. A coin-freed prepayment mechanism, comprising in combination a pivotally-carried prepayment-shaft, an engaging member on the prepayment-shaft, a coin-pocket shaft, an engaging member on the coin-pocket shaft, adapted to gear with the engaging member on the prepayment-shaft, a scaled disk on the coin-pocket shaft, a movable pointer on said disk, members carried by the movable pointer and disk adapted to actuate the pivotally-carried prepayment-shaft whereby it is in gear with the coin-pocket shaft for a variable portion of each revolution of the latter, substantially as described.

11. A coin-freed prepayment mechanism, comprising in combination, a pivotally-carried prepayment-shaft, an engaging member on the prepayment-shaft, a coin-pocket shaft, an engaging member on the coin-pocket shaft adapted to gear with the engaging member on the prepayment-shaft, spring-controlled ratchet mechanisms adapted to limit the backward rotation of the coin-pocket and prepayment shafts as desired, a scaled disk on the coin-pocket shaft, a movable pointer on said disk, cam-surfaces on the movable pointer and disk adapted to operate projections and pawls whereby the prepayment-shaft is in gear with the coin-pocket shaft for a variable portion of each revolution of the latter, substantially as described.

In witness whereof I have hereunto set my hand in presence of two witnesses.

WILLIAM COWAN.

Witnesses:
ALBERT E. PARKER,
A. COCKERELL.